United States Patent

[11] 3,543,858

[72] Inventors  Daryl W. Nooner
　　　　　　　Houston, Texas;
　　　　　　　Jack H. Kolaian, Wappingers Falls, New York
[21] Appl. No.  769,406
[22] Filed      Oct. 21, 1968
[45] Patented   Dec. 1, 1970
[73] Assignee   Texaco Inc.
　　　　　　　New York, New York
　　　　　　　a corporation of Delaware

[54] STABILIZATION OF MONTMORILLONITE CLAYS IN AN UNDERGROUND FORMATION
　　　1 Claim, No Drawings

[52] U.S. Cl. ......................................................... 166/303
[51] Int. Cl. ..................................................... E21b 43/22
[50] Field of Search ............................................ 166/272,
　　　　　　　　　　　　　　　　　275, 302, 303, 305; 106/72

[56]　　　　　　　References Cited
　　　　　　　UNITED STATES PATENTS
2,307,239   1/1943   Rowland ......................  106/72X
2,685,930   8/1954   Albaugh ......................  166/302
3,237,692   3/1966   Wallace et al. ...............  166/303
3,292,702  12/1966   Boberg ........................  166/303
3,353,593  11/1967   Boberg ........................  166/303X
3,357,487  12/1967   Gilchrist et al. ..............  166/303X
3,379,249   4/1968   Gilchrist et al. ..............  166/303X
3,410,345  11/1968   Fradkin .......................  166/303

OTHER REFERENCES

Smith, C. F., et al. Potassium, Calcium Treatments Inhibit Clay Swelling. In Oil & Gas Journal, Nov. 30, 1964. pp. 80 & 81. (Copy in 166— 305)

Primary Examiner—Marvin A. Champion
Assistant Examiner—Ian A. Calvert
Attorneys—K. E. Kavanagh and Thomas H. Whaley ABSTRACT: A method of treating subterranean formations containing water-sensitive montmorillonite clays by contacting the formation with an aqueous solution of potassium salt at elevated temperatures whereby the montmorillonite is transformed into other clay minerals which are less sensitive to swelling when contacted with water.

3,543,858

STABILIZATION OF MONTMORILLONITE CLAYS IN AN UNDERGROUND FORMATION

FIELD OF THE INVENTION

This invention relates to an improved method for the treatment of clay-containing formations. More particularly, this invention relates to a method of treating subterranean formations containing water-sensitive montmorillonite clays by hydrothermal means to increase water permeability and to stabilize the clays contained therein.

DESCRIPTION OF THE PRIOR ART

In modern day production of hydrocarbons from subterranean formations, it has become fairly common practice to apply secondary recovery techniques to the hydrocarbon-bearing formations to recover additional quantities of hydrocarbons therefrom. Among the methods employed in secondary recovery operations are those involving water, steam or gas flooding or combinations thereof. One of the more serious problems encountered in secondary recovery operations with water or hydrothermal procedures, such as steam flooding, is that an underground hydrocarbon-bearing formation also may contain clay or claylike bodies which swell or disperse on contact with water. In particular, the presence of hydratable clays, such as montmorillonite, often results in substantial decreases in permeability when water comes into contact with the formation. Thus, the secondary recovery processes involving treatment of such a formation with water or low quality steam generally result in swelling of the clays by adsorption of the water with the concomitant result that the permeability of the formation is materially decreased. The decrease in the permeability of the formation to water results in the reduction of the amount of hydrocarbon which may be recovered therefrom by means of the secondary recovery procedure.

Many techniques for stabilizing water-sensitive formations have been devised which involve minimizing total interparticle swelling by the introduction of exchange cations such as calcium. Other techniques involve the use of organic cations, such as guanidine hydrochloride, which are adsorbed on the clay thereby preventing hydration and swelling. However, the use of both organic and inorganic materials, which depend for success upon the exchange capacity of the clays, are limited by the fact that the mineralogical structure of the water-sensitive clays is not altered and hence the stabilization is not truly irreversible, especially at higher temperatures.

More recently, the effects on the mineralogy of formation matrices of hydrothermal treatments, such as steam flooding, have been reported. For example, in formations containing quartz, nonexpandable clays, such as kaolinite, and traces of carbonate minerals, hydrothermal treatments may dissolve a portion of these minerals and convert a further portion into a new expandable form of clay mineral known as montmorillonite. This new, synthesized montmorillonite, owing to its water adsorption and swelling properties, is expandable and thereby causes a decrease in permeability and porosity of the formation, with a resultant decrease in hydrocarbon production from the formation. Since the majority of hydrocarbon-bearing formations contain minerals which are capable of such montmorillonite synthesis, the inhibition of these undesirable reactions is important when considering hydrothermal processes in secondary recovery.

The U.S. Pat. to Day et al., 3,384,177, discloses a method whereby the transformation of kaolinitic clays into water-sensitive montmorillonite can be inhibited through the use of ammonium hydroxide in clay containing sandstones. This patent teaches that the montmorillonite can be converted into a nonexpandable clay when subjected to an ammonia treatment at elevated temperatures, which thereby minimizes adverse swelling during subsequent contact of the formation with aqueous media.

We have discovered now that montmorillonite can be transformed to nonexpanding illitic and lesser expanding mixed-layer clays, that is, randomly or regularly interstratified intergrowths of illite and montmorillonite, when treated with potassium salts at elevated temperatures.

Accordingly, it is the object of this invention to provide a simple and effective method by which a water-sensitive clay can be rendered insensitive to aqueous media, by transforming, irreversibly, its mineralogical structure.

SUMMARY OF THE INVENTION

This invention provides a method of transforming mineralogically a formation matrix by injecting thereinto a heated aqueous solution of a potassium salt, continuing the injection until the formation is heated to an elevated temperature for a desired length of time until stabilization of the formation is effected to a desired radial distance from the well bore.

DESCRIPTION OF THE INVENTION

With the method of this invention, clay-containing formations are effectively transformed to stabilize their swelling upon subsequent exposure to aqueous media, such as water, hot water, or steam. The method has utility as a pretreatment operation for any operation, such as well stimulation or secondary recovery, wherein a hydrothermal treatment is to be undertaken. For example, a subsequent steam flooding operation, by means well known in the art, may be accomplished without the normally associated clay swelling and/or dispersion. Such pretreatment permits more effective recovery of the hydrocarbons contained in the formation, since blocking and plugging of the formation by the flooding fluid is precluded or retarded, thereby allowing the easier penetration of the formation by the flooding fluids.

The invention herein disclosed provides an improved method for the stabilization of subterranean formation. Exposure of the formation to temperatures of from about 500° F. to about 600° F. and an aqueous solution of a potassium salt having a concentration from about 0.5N to about 3.0N produces a transformation of the water-sensitive montmorillonite clays to a more stable illitic-type clay.

The following examples based on the results of tests are illustrative of the method of this invention. Mixtures consisting of montmorillonite and quartz; dolomite, kaolinite, and quartz; and montmorillonite, illite, chlorite, kaolinite, plagioclase feldspar, potassium feldspar, and quartz were ground to pass a 200 mesh screen. Portions of these mixtures were then placed in stainless steel bombs and thereafter a treating solution was added. The treating solutions used were a 0.5N potassium chloride in distilled water and a synthetic formation water which had an approximate composition of the interstitial water contained in the Sespe zone, South Mountain Field, Ventura County, California. The composition of the synthetic formation water as compared with the Sespe zone water is shown in table I, where the concentrations are given in parts per million.

TABLE I

| Ions | Sespe zone | Synthetic formation [1] water |
|---|---|---|
| Calcium | 6,040 | 6,000 |
| Magnesium | 24 | 26 |
| Sodium | 6,341 | 6,040 |
| Potassium | | |
| Bicarbonate | 623 | 620 |
| Sulfate | 104 | 82 |
| Chloride | 20,100 | 19,950 |
| Total solids | 33,232 | 33,218 |

[1] In distilled water.

The bombs were sealed and then maintained at a given temperature for a given period of time after which the solid products were analyzed for mineral composition by X-ray diffraction. The results from these tests are given in table II, wherein the mineralogical analysis, in percent by weight, is given for the samples before and after treatment.

The results demonstrate that treatment with the potassium chloride solution at 575° F. for seven days caused transformation of the swelling clay (montmorillonite) to nonswelling clay (illite) and lesser swelling clays (mixed-layer).

TABLE II

| Treating solution | Conditions | | Mineralogical analysis, percent by weight | | | | | | | |
|---|---|---|---|---|---|---|---|---|---|---|
| | Time (days) | Temp. (° F.) | | M | I | ML | Ch | K | PF | KF | Q |
| 0.5 N potassium chloride in distilled water | 7 | 575 | Before | 10 | | | | | | | 90 |
| | | | After | <1 | 3 | 7 | | | | | 89 |
| 0.5 N potassium chloride in synthetic formation water | 7 | 575 | Before | 10 | | | | | | | 90 |
| | | | After | <1 | 3 | 6 | | | | | 90 |
| 0.5 N potassium chloride in synthetic formation water | 7 | 575 | Before | 7 | 1 | | 1 | 2 | 14 | 14 | 61 |
| | | | After | 3 | 6 | | 1 | 2 | 14 | 13 | 61 |

See notes at end of Table III.

TABLE III

| Treating solution | Conditions | | Mineralogical analysis, percent by weight | | | | | | | |
|---|---|---|---|---|---|---|---|---|---|---|
| | Time (days) | Temp. (° F.) | | M | I | ML | Ch | K | PF | KF | Q |
| Synthetic formation water | 7 | 575 | Before | 22 | 8 | | 4 | 22 | 18 | | 26 |
| | | | After | 23 | 7 | | 1 | 2 | 20 | 14 | 33 |
| 0.5 N potassium chloride in synthetic formation water | 7 | 575 | Before | 22 | 8 | | 4 | 22 | 18 | | 26 |
| | | | After | 12 | 11 | 1 | 4 | 20 | 16 | | 36 |

NOTES.—M=Montmorillonite; I=Illite; ML=Mixed-layer (illite-montmorillonite); Ch=Chlorite; K=Kaolinite; PF=Plagioclase feldspar; KF=Potassium feldspar; Q=Quartz.

In a second set of tests, plugs were taken from cores from the Sespe zone, South Mountain Field, Ventura County, California, and were treated similarly. The results shown in table III, demonstrate that in the absence of the potassium salt, the effect on montmorillonite was minimal. However, with the presence of 0.5N potassium chloride, the treatment effectively transformed the montmorillonite to illite and mixed-layer type clays.

These tests demonstrate that an aqueous solution of a potassium salt effectively transforms the montmorillonite to illitic and mixed-layer clays upon hydrothermal treatment. Thus, there has been shown an improved method of treating a subterranean hydrocarbon-bearing formation by hydrothermal means in order to stabilize the water-sensitive clays therein.

Other modifications and variations, as hereinbefore set forth, may be made without departing from the spirit and scope thereof, and therefore only such limitations should be imposed as are indicated in the appended claims.

I claim:

1. A method of altering the matrix of a hydrocarbon-bearing formation having present therein montmorillonite clays, comprising the steps of introducing via a wellbore penetrating said formation an aqueous solution of about 0.5N to about 3.0N potassium chloride at a temperature of at least 500° F., thereafter injecting said solution into said formation and continuing injection until said matrix is heated to a minimum temperature of about 500° F. for a desired radial distance from said wellbore, whereby said matrix is stabilized by mineralogically altering said montmorillonite clays.

PO-1050
(5/69)

UNITED STATES PATENT OFFICE
CERTIFICATE OF CORRECTION

Patent No. 3,543,858                    Dated December 1, 1970

Inventor(s) Daryl W. Nooner and Jack H. Kolaian

It is certified that error appears in the above-identified patent and that said Letters Patent are hereby corrected as shown below:

In the specification:
Col. 2, line 70, last column, line up 6,040 with sodium, add --500-- for potassium Signed and sealed this 13th day of July 1971.

(SEAL)
Attest:

EDWARD M. FLETCHER, JR.          WILLIAM E. SCHUYLER, JR.
Attesting Officer                 Commissioner of Patents